(12) United States Patent
Williams et al.

(10) Patent No.: US 11,556,472 B1
(45) Date of Patent: Jan. 17, 2023

(54) DATA PROCESSING SYSTEM HAVING MASTERS THAT ADAPT TO AGENTS WITH DIFFERING RETRY BEHAVIORS

(71) Applicant: INTERNATIONAL BUSINESS MACHINES CORPORATION, Armonk, NY (US)

(72) Inventors: Derek E. Williams, Round Rock, TX (US); Alexander Michael Taft, Austin, TX (US); Guy L. Guthrie, Round Rock, TX (US); Bernard C. Drerup, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/394,195

(22) Filed: Aug. 4, 2021

(51) Int. Cl.
  *G06F 12/08* (2016.01)
  *G06F 12/0831* (2016.01)
  *G06F 9/30* (2018.01)
  *G06F 12/0817* (2016.01)

(52) U.S. Cl.
  CPC ...... *G06F 12/0831* (2013.01); *G06F 9/30145* (2013.01); *G06F 12/082* (2013.01)

(58) Field of Classification Search
  CPC . G06F 12/0831; G06F 9/30145; G06F 12/082
  See application file for complete search history.

(56) References Cited

U.S. PATENT DOCUMENTS

| | | | |
|---|---|---|---|
| 9,529,712 B2 | 12/2016 | Kelleher et al. | |
| 9,652,398 B2 | 5/2017 | Hooker et al. | |
| 10,296,230 B1 | 5/2019 | Balakrishnan et al. | |
| 10,599,577 B2 | 3/2020 | Mukherjee et al. | |
| 10,649,922 B2 | 5/2020 | Fukami et al. | |
| 10,725,957 B1 | 7/2020 | Davis et al. | |

(Continued)

FOREIGN PATENT DOCUMENTS

| | | |
|---|---|---|
| CN | 108885583 A | 11/2018 |
| CN | 112131063 A | 12/2020 |

OTHER PUBLICATIONS

Muneeswari et al.; "Agent Based Load Balancing Scheme Using Affinity Processor Scheduling for Multicore Architectures", Issue 8, vol. 10, Aug. 2011.

(Continued)

*Primary Examiner* — Pierre Michel Bataille
(74) *Attorney, Agent, or Firm* — Brian F. Russell; Nathan Rau

(57) ABSTRACT

A data processing system includes a plurality of snoopers, a processing unit including master, and a system fabric communicatively coupling the master and the plurality of snoopers. The master sets a retry operating mode for an interconnect operation in one of alternative first and second operating modes. The first operating mode is associated with a first type of snooper, and the second operating mode is associated with a different second type of snooper. The master issues a memory access request of the interconnect operation on the system fabric of the data processing system. Based on receipt of a combined response representing a systemwide coherence response to the request, the master delays an interval having a duration dependent on the retry operating mode and thereafter reissues the memory access request on the system fabric.

19 Claims, 9 Drawing Sheets

(56) References Cited

U.S. PATENT DOCUMENTS

| | | | |
|---|---|---|---|
| 2002/0124145 A1* | 9/2002 | Arimilli | G06F 12/0831 |
| | | | 711/146 |
| 2002/0129211 A1* | 9/2002 | Arimilli | G06F 12/0831 |
| | | | 711/146 |
| 2003/0137519 A1 | 7/2003 | Nazanda et al. | |
| 2007/0081516 A1* | 4/2007 | Arimilli | G06F 15/16 |
| | | | 370/351 |
| 2007/0226427 A1* | 9/2007 | Guthrie | G06F 12/0831 |
| | | | 711/146 |
| 2007/0266126 A1* | 11/2007 | Clark | G06F 12/1458 |
| | | | 709/223 |
| 2009/0198914 A1* | 8/2009 | Arimilli | G06F 12/0831 |
| | | | 711/146 |
| 2013/0262736 A1 | 10/2013 | Kegel et al. | |
| 2014/0250276 A1* | 9/2014 | Blaner | G06F 12/0831 |
| | | | 711/146 |
| 2015/0220461 A1* | 8/2015 | Auernhammer | G06F 13/1642 |
| | | | 710/310 |
| 2017/0293558 A1* | 10/2017 | Guthrie | G06F 12/0842 |
| 2018/0357001 A1 | 12/2018 | Scheer et al. | |
| 2019/0108891 A1* | 4/2019 | Lee | G11C 29/42 |
| 2019/0196963 A1* | 6/2019 | Byun | G06F 12/0246 |
| 2020/0257623 A1 | 8/2020 | Yin et al. | |
| 2021/0034527 A1 | 2/2021 | Klingauf et al. | |
| 2021/0124643 A1 | 4/2021 | Ioannou et al. | |

OTHER PUBLICATIONS

Gero et al.; "Understanding Behaviors of a Constructive Memory Agent: A Markov Chain Analysis".

Khadka et al.; "A Memory-Based Multiagent Framework for Adaptive Decision Making".

Khadka et al.; "Memory Based Multiagent One Shot Learning".

Xie et al.; "PIPP: Promotion/Insertion Pseudo-Partitioning of Multi-Core Shared Caches", In the proceedings of the 36th ACM/IEEE International Symposium on Computer Architecture, Jun. 2009.

PCT International Search Report and Written Opinion, PCT/CN2022/095765, dated Aug. 31, 2022.

* cited by examiner

DATA PROCESSING SYSTEM HAVING MASTERS THAT ADAPT TO AGENTS WITH DIFFERING RETRY BEHAVIORS

BACKGROUND

The present invention relates to data processing and, more particularly, to improving data processing system performance by adapting the behavior of masters to bus agents having differing retry behaviors.

A conventional symmetric multiprocessor (SMP) computer system, such as a server computer system, includes multiple processing units all coupled to a system interconnect, which typically comprises one or more address, data, and control buses. Coupled to the system interconnect is a system memory, which represents the lowest level of shared memory in the multiprocessor computer system and which generally is accessible for read and write access by all processing units. In order to reduce access latency to instructions and data residing in the system memory, each processing unit is typically further supported by a respective multi-level vertical cache hierarchy, the lower level(s) of which may be shared by one or more processor cores.

Because multiple processor cores may request write access to a same memory block (e.g., cache line or sector) and because cached memory blocks that are modified are not immediately synchronized with system memory, the cache hierarchies of multiprocessor computer systems typically implement a cache coherence protocol to ensure at least a minimum required level of coherence among the various processor core's "views" of the contents of system memory. The minimum required level of coherence is determined by the selected memory consistency model, which defines rules for the apparent ordering and visibility of updates to the distributed shared memory. In all memory consistency models in the continuum between weak consistency models and strong consistency models, cache coherency requires, at a minimum, that after a processing unit accesses a copy of a memory block and subsequently accesses an updated copy of the memory block, the processing unit cannot again access the old ("stale") copy of the memory block.

A cache coherence protocol typically defines a set of coherence states stored in association with cached copies of memory blocks, as well as the events triggering transitions between the coherence states and the coherence states to which transitions are made. Coherence protocols can generally be classified as directory-based or snoop-based protocols. In directory-based coherence protocols, a common central directory maintains coherence by controlling accesses to memory blocks by the caches and by updating or invalidating copies of the memory blocks held in the various caches. Snoop-based coherence protocols, on the other hand, implement a distributed design paradigm in which each cache maintains a private directory of its contents, monitors ("snoops") the system interconnect for memory access requests targeting memory blocks held in the cache, and responds to the memory access requests by updating its private directory, and if required, by transmitting coherence message(s) and/or its copy of the memory block.

The cache states of the coherence protocol can include, for example, those of the well-known MESI (Modified, Exclusive, Shared, Invalid) protocol or a variant thereof. The MESI protocol allows a cache line of data to be associated with one of four states: "M" (Modified), "E" (Exclusive), "S" (Shared), or "I" (Invalid). The Modified state indicates that a memory block is valid only in the cache holding the Modified memory block and that the memory block is not consistent with system memory. The Exclusive state indicates that the associated memory block is consistent with system memory and that the associated cache is the only cache in the data processing system that holds the associated memory block. The Shared state indicates that the associated memory block is resident in the associated cache and possibly one or more other caches and that all of the copies of the memory block are consistent with system memory. Finally, the Invalid state indicates that the data and address tag associated with a coherency granule are both invalid.

In snoop-based coherence protocols, it is common for caches and other bus agents participating in operations on the interconnect to respond to a request snooped on the interconnect by providing an individual coherence response. These individual coherence responses are then combined or otherwise processed to determine a final systemwide coherence response for the request, which can indicate, for example, whether or not the request will be permitted to succeed or will have to be retried, a data source responsible for supplying to the requesting cache a target cache line of data identified in the request, a coherence state of the target cache line at one or more caches following the request, etc.

The present disclosure appreciates that bus agents participating in a snoop-based coherence protocol can exhibit multiple different retry behaviors, depending on the construction and function of each such bus agent. For example, a bus agent, such as a memory controller for a system memory, typically provides an individual retry coherence response for a request targeting an address for which the bus agent is responsible only if the bus agent cannot handle the request, for example, due to a collision with a prior request with the same target address or a lack of capacity to receive and process the request. Other bus agents, such as a bus bridge, can exhibit a different retry behavior in which the bus agent provides a retry response for a request targeting an address for which the bus agent is responsible not only due to collisions and lack of capacity, but also due to the need of the bus agent to perform processing in response to the request, for example, by issuing a corresponding request on a secondary bus before acknowledging the request when re-presented on the primary bus.

BRIEF SUMMARY

The present disclosure appreciates that, in prior art data processing systems, a bus agent that initiates requests on the system interconnect (referred to herein as a master) does not adapt its behavior depending of the differing retry behaviors of the various bus agents that may be a target of a request. As a result, the master may consume the limited bandwidth of the system interconnect inefficiently by issuing too many requests or issuing requests too frequently in response to retry coherence responses.

In at least one embodiment, a master of a request on a system interconnect of a data processing system adapts its behavior in response to a retry coherence response based on a type of bus agent that is a target of the request.

In at least one embodiment, a data processing system includes a plurality of snoopers, a processing unit including master, and a system fabric communicatively coupling the master and the plurality of snoopers. The master sets a retry operating mode for an interconnect operation in one of alternative first and second operating modes. The first operating mode is associated with a first type of snooper, and the second operating mode is associated with a different second type of snooper. The master issues a memory access request of the interconnect operation on the system fabric of the data processing system. Based on receipt of a combined response representing a systemwide coherence response to the request, the master delays an interval having a duration dependent on the retry operating mode and thereafter reissues the memory access request on the system fabric.

DETAILED DESCRIPTION

Figure 1:
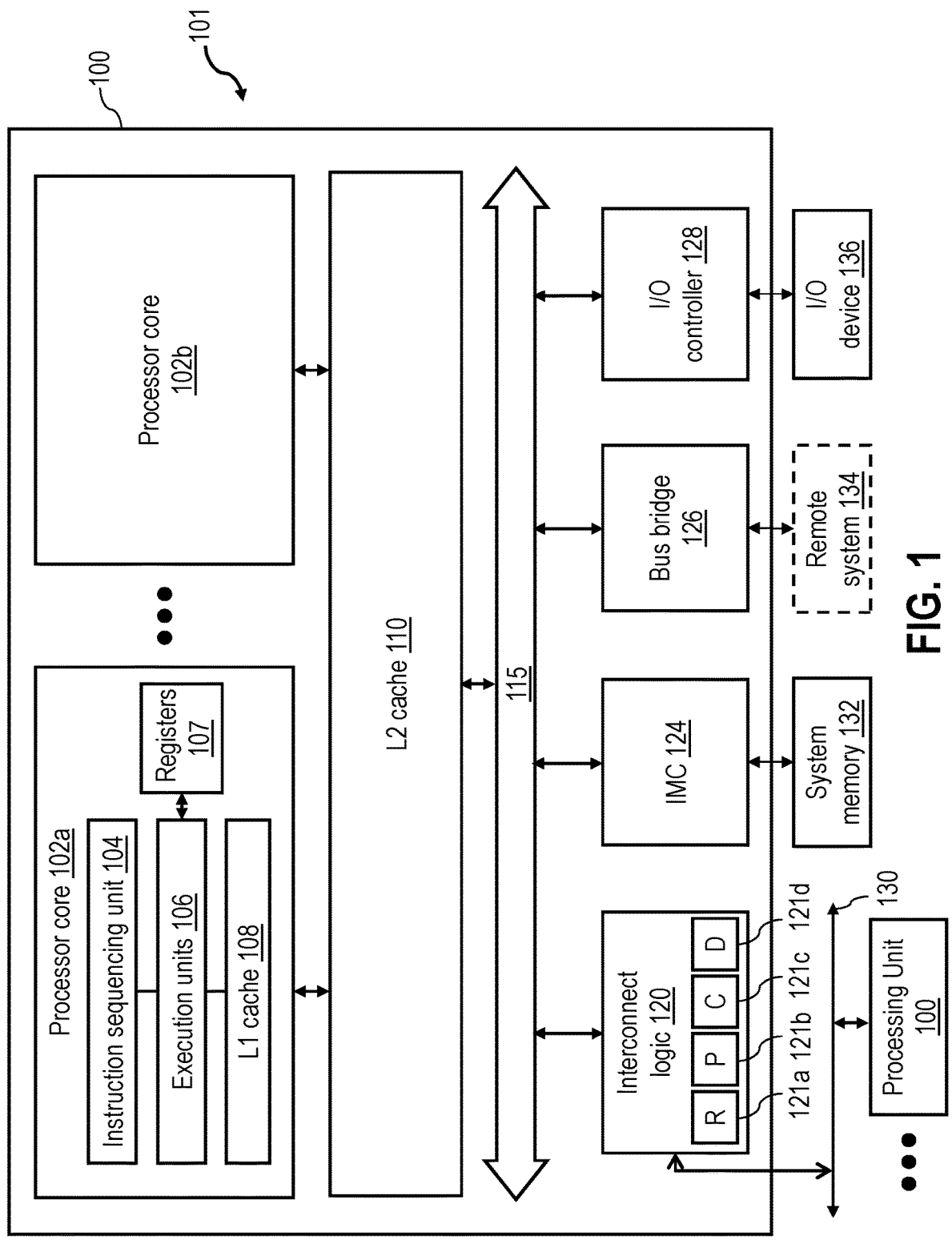
FIG. 1 is a high-level block diagram of a data processing system in accordance with one embodiment.

With reference now to the figures and, in particular, with reference to FIG. 1, there is illustrated a high-level block diagram of an exemplary embodiment of a multiprocessor data processing system 101 in accordance with one embodiment. In the depicted embodiment, data processing system 101 includes multiple processing units 100 coupled to a system fabric. In the illustrated example, each processing unit 100 is a single integrated circuit including two or more processor cores 102a, 102b for independently processing instructions and data. (Of course, in other embodiments, the number of processor cores 102 may vary.) Each processor core 102 includes an instruction sequencing unit (ISU) 104 for fetching and ordering instructions for execution and one or more execution units 106 for executing instructions. For example, execution units 106 may include one or more floating-point units (FPUs), one or more load-store units (LSUs), and one or more integer units (IUs), etc. The instructions executed by execution units 106 may include, for example, fixed- and floating-point arithmetic instructions, logical instructions, and instructions that request read and/or write access to a memory block. Execution units 106 are coupled to registers 107, which temporarily buffer, among other data, source operands and destination operands of instructions executed by execution units 106.

The operation of each processor core 102 is supported by a multi-level memory hierarchy having at its lowest level one or more shared system memories 132 (only one of which is shown in FIG. 1). Each system memory 132 is controlled by an associated integrated memory controller (IMC) 124, which controls read and write access to the system memory 132 in response to requests on an interconnect fabric that includes a local bus 115 within processing unit 100 and system bus 130.

The multi-level memory hierarchy additionally includes, at its upper levels, a vertical cache memory hierarchy including one or more levels of cache memory. In the illustrative embodiment, the vertical cache memory hierarchy of a processing unit 100 includes a store-through level one (L1) cache 108 within each processor core 102a and a level two (L2) cache 110 shared by all processor cores 102 of the processing unit 100. (In other embodiments, each processor core 102 may have its own private L2 cache 110.) Although the illustrated cache hierarchy includes only two levels of cache memory, those skilled in the art will appreciate that alternative embodiments may include additional levels (e.g., level three (L3), level four (L4), etc.) of on-chip or off-chip in-line or look-aside cache, which may be fully inclusive, partially inclusive, or non-inclusive of the contents the upper levels of cache.

As further shown in FIG. 1, processing unit 100 includes integrated interconnect logic 120 by which local bus 115 of processing unit 100 may be coupled to system bus 130 to form a portion of the interconnect fabric of a larger multiprocessor data processing system. Interconnect logic 120 includes request logic (labeled 'R') 121a, partial response logic (labeled 'P') 121b, combined response logic (labeled 'C') 121c and data logic (labeled 'D') 121d for processing and forwarding information during different phases of operations on the interconnect fabric.

Each processing unit 100 may also include a bus bridge 126 supporting connection of a possibly non-coherent remote data processing system 134 and an integrated I/O (input/output) controller 128 supporting the attachment of one or more I/O devices, such as I/O device 136. Those skilled in the art will appreciate that data processing system 101 can include many additional unillustrated components, such as non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Figure 2:
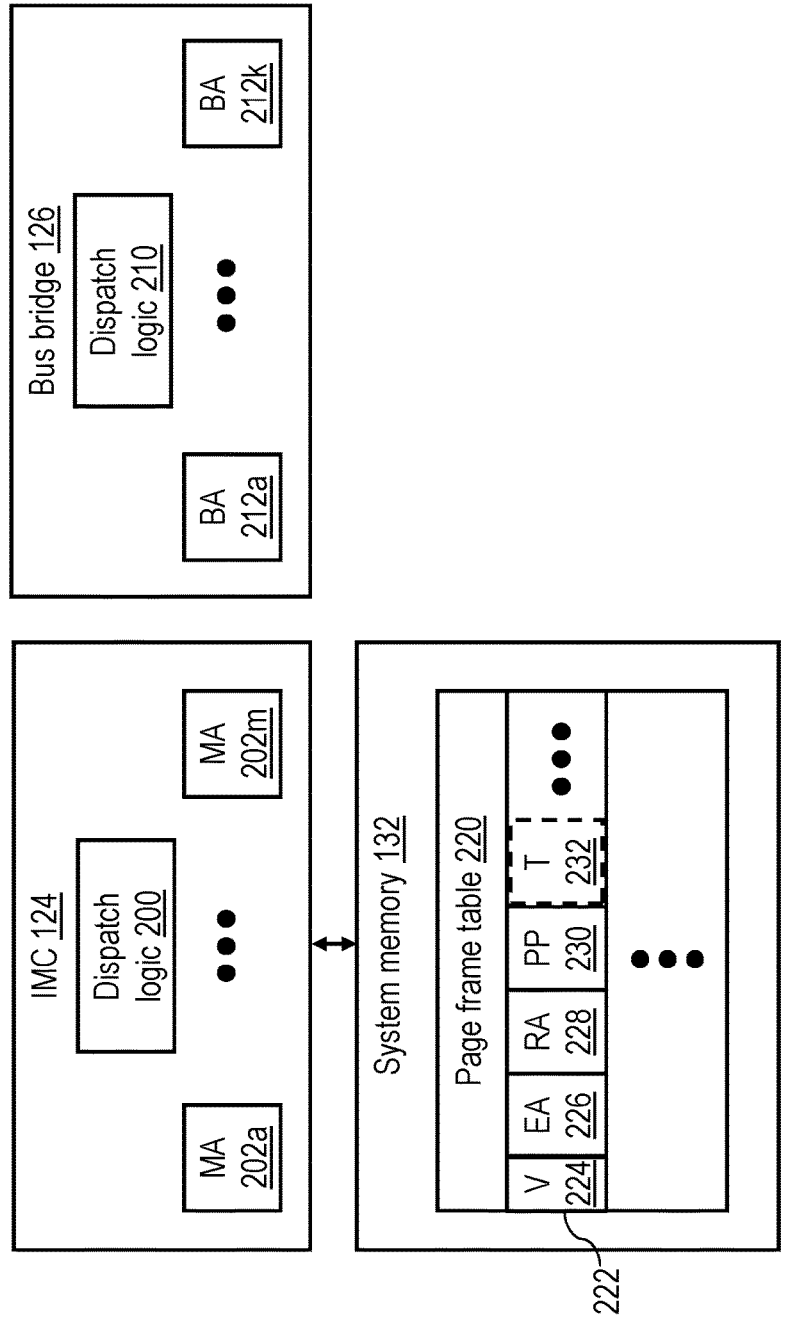
FIG. 2 is a more detailed block diagram of a memory controller and a bus bridge of an exemplary data processing system in accordance with one embodiment.

Referring now to FIG. 2, there is depicted a more detailed block diagram of a memory controller 124 and a bus bridge 126 of an exemplary data processing system 101 in accordance with one embodiment. In the illustrated example, each of IMC 124 and bus bridge 126 includes a respective instance of dispatch logic 200 or 210, which monitors the interconnect fabric for requests specifying target real addresses for which the associated one of IMC 124 and bus bridge 126 is responsible. In addition, each of IMC 124 and bus bridge 126 includes one or more agents that service requests received via the system fabric. For example, IMC 124 includes memory agents (MA) 202*a*-202*m* for independently and concurrently serving requests to read memory blocks from, and store memory blocks to the associated system memory 132. Similarly, bus bridge 126 includes bus agents (BA) 212*a*-212*k* for independently and concurrently bridging various types of requests between remote system 134 and the system fabric of data processing system 101.

FIG. 2 further illustrates that a system memory 132 stores a page frame table 220 including a plurality of page table entries (PTEs) 222 for translating addresses from the effective address (EA) space employed by processor cores 102 to the real address (RA) space employed by L2 caches 110, IMCs 124, and bus bridges 126. In the illustrated embodiment, each PTE 222 includes a valid field 224 indicating whether or not the content of the PTE 222 is valid, an EA field 226 indicating an EA of a memory page, an RA field 228 indicating the corresponding RA of the memory page, and a page permission (PP) filed 230 indicating access permissions for the memory page (e.g., read-only, read-write, etc.). In some embodiments, PTE 222 may optionally include a type (T) field 232 indicating a type of device to which the RA is assigned. In at least one embodiment, type field 232 indicates at least two types, "progressing" devices, such as bus bridge 126, and "non-progressing" devices, such as IMC 124, as discussed further below.

Figure 3:
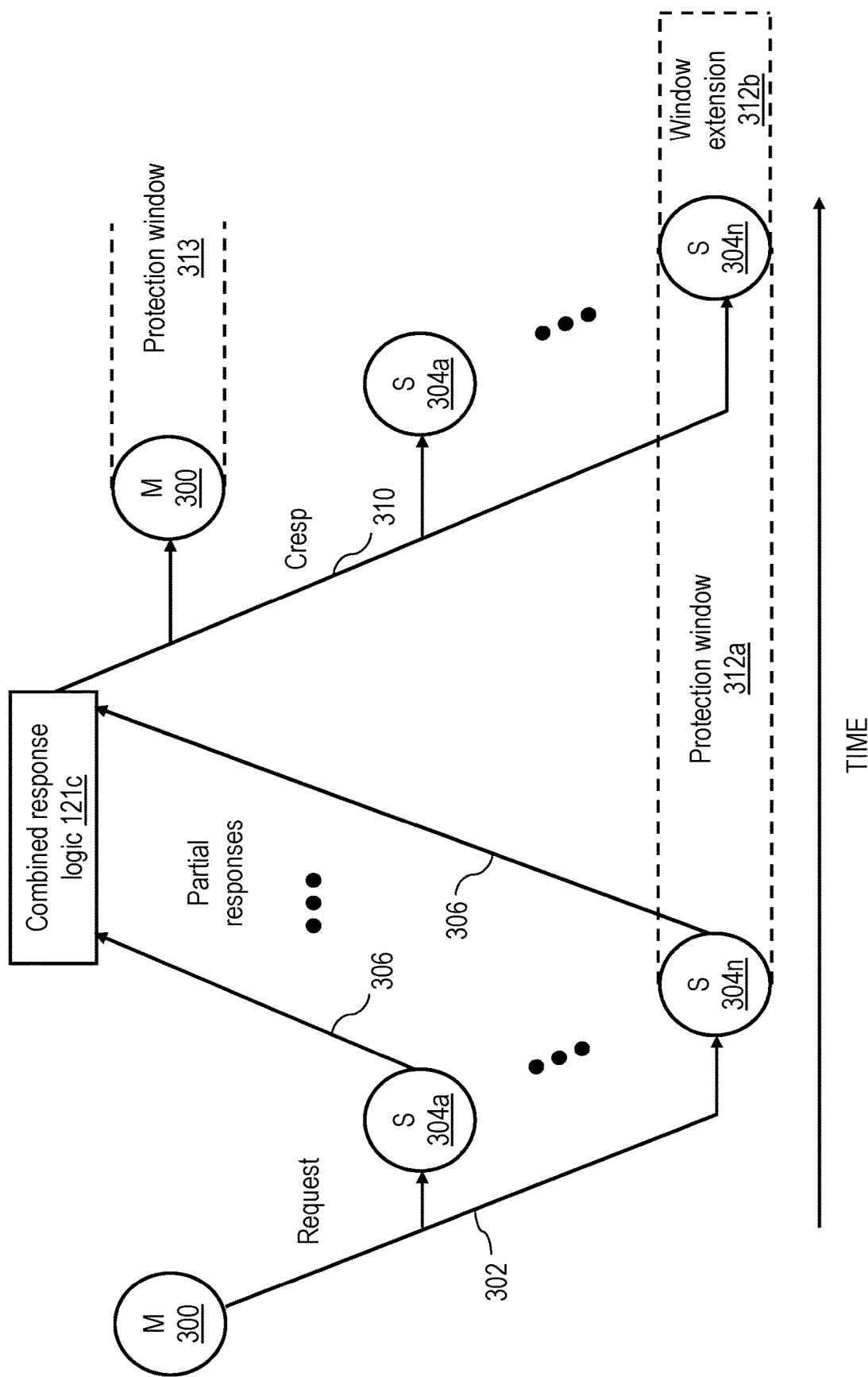
FIG. 3 is a time-space diagram of an exemplary operation on the system interconnect of the data processing system of FIG. 1.

Referring now to FIG. 3, there is depicted a time-space diagram of an exemplary interconnect operation on the system fabric of data processing system 101 of FIG. 1. The interconnect operation begins when a master 300 (e.g., a read-claim (RC) machine 512 of an L2 cache 110 (see, e.g., FIG. 5) or a master within an I/O controller 128) issues a request 302 on the interconnect fabric. Request 302 preferably includes at least a transaction type indicating a type of desired access and a resource identifier (e.g., target real address) indicating a resource to be accessed by the request. Common types of requests include those set forth below in Table I.

TABLE 1

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory |

TABLE 1-continued

| Request | Description |
| --- | --- |
| | in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 302 is received by snoopers 304 (e.g., in L2 caches 110, IMCs 124, and bus bridges 126) distributed throughout data processing system 101. In general, with some exceptions, snoopers 304 in the same L2 cache 110 as the master 300 of request 302 do not snoop request 302 (i.e., there is generally no self-snooping) because a request 302 is transmitted on the interconnect fabric only if the request 302 cannot be serviced internally by a processing unit 100. Snoopers 304 that receive and process requests 302 each provide a respective partial response (Presp) 306 representing the response of at least that snooper 304 to request 302. A snooper within an IMC 124 or bus bridge 126 determines the partial response 306 to provide based, for example, upon whether the IMC 124 or bus bridge 126 is responsible for the request address, whether the target real address of the request collides with a prior request, and whether the IMC 124 or bus bridge 126 has resources (e.g., including an idle agent 202 or 212) available to service the request. An L2 cache 110 may determine its partial response 306 based on, for example, the availability of a snoop machine 511 to handle the request, the availability of its L2 cache directory 508 (see, e.g., FIG. 5), and the coherency state associated with the target real address in L2 cache directory 508.

The partial responses 306 of snoopers 304 are logically combined either in stages or all at once by one or more instances of combined response logic 121*c* to determine a system-wide combined response (Cresp) 310 to request 302. In one embodiment, which is assumed hereinafter, the instance of combined response logic 121*c* responsible for generating Cresp 310 is located in the processing unit 100 containing the master 300 that issued request 302. Combined response logic 121*c* provides Cresp 310 to master 300 and snoopers 304 via the interconnect fabric to indicate the system-wide coherence response (e.g., success, failure, retry, etc.) to request 302. If Cresp 310 indicates success of request 302, Cresp 310 may indicate, for example, a data source for a target memory block of request 302, a coherence state in which the requested memory block is to be cached by master 300 (or other caches), and whether "cleanup" operations invalidating the requested memory block in one or more caches are required.

In response to receipt of Cresp 310, one or more of master 300 and snoopers 304 typically perform one or more additional actions in order to service request 302. These additional actions may include supplying data to master 300, invalidating or otherwise updating the coherence state of data cached in one or more L2 caches 110, performing castout operations, writing back data to a system memory 132, etc. If required by request 302, a requested or target memory block may be transmitted to or from master 300 before or after the generation of Cresp 310 by combined response logic 121*c*.

In the following description, the partial response 306 of a snooper 304 to a request 302 and the actions performed by the snooper 304 in response to the request 302 and/or its combined response 310 will be described with reference to whether that snooper is a Highest Point of Coherency (HPC), a Lowest Point of Coherency (LPC), or neither with respect to the request (target) address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIG. 1, the LPC will be the memory controller 124 for the system memory 132 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIG. 1, the HPC, if any, will be an L2 cache 110. Although other indicators may be utilized to designate an HPC for a memory block, a preferred embodiment of the present invention designates the HPC, if any, for a memory block utilizing selected cache coherency state(s) within the cache directory of an L2 cache 110.

Still referring to FIG. 3, the HPC, if any, for a memory block referenced in a request 302, or in the absence of an HPC, the LPC of the memory block, preferably has the responsibility of protecting the transfer of coherence ownership of a memory block, if necessary, in response to a request 302. In the exemplary scenario shown in FIG. 3, a snooper 304n at the HPC (or in the absence of an HPC, the LPC) for the memory block specified by the request address of request 302 protects the transfer of coherence ownership of the requested (target) memory block to master 300 during a protection window 312a that extends from the time that snooper 304n determines its partial response 306 until snooper 304n receives Cresp 310 and during a subsequent window extension 312b extending a programmable time beyond receipt by snooper 304n of Cresp 310. During protection window 312a and window extension 312b, snooper 304n protects the transfer of coherence ownership of the target memory block from snooper 304n to mater 300 by providing partial responses 306 (e.g., retry partial responses) to other requests specifying the same request address. Such partial responses 306 prevent other masters from obtaining coherence ownership of the target memory block until coherence ownership has been successfully transferred from snooper 304n to master 300. If necessary, following receipt of combined response 310, master 300 may likewise initiate a protection window 313 to protect its acquisition of coherence ownership of the target memory block. Protection window 313 ensures that any master subsequently requesting the target memory block will receive any new value of the target memory block created by master 300 rather than a stale value.

Certain snoopers 304, such IMC 124, bus bridge 126, I/O controller 128, are generally assigned one or more respective ranges of real memory addresses for which the snoopers are ultimately responsible in the absence of a caching snooper. As a consequence, these snoopers 304 can be collectively referred to as "LPC snoopers." At most one LPC snooper is responsible for any given range of real memory addresses. The range(s) of real memory addresses for which an LPC snooper 304 is responsible can be established, for example, by operating system or hypervisor software appropriately configuring a base address register (BAR) facility in the LPC snooper 304. Those skilled in the art will appreciate that the responses of LPC snoopers 304 to requests 302 snooped on the system fabric differ significantly. For example, if dispatch logic 210 of bus bridge 126 accepts a request 302 for processing by one of BAs 212, bus bridge 126 will still issue a Retry partial response 306 to force the master 300 to reissue the request 302 at a later time. While awaiting the reissued request (which may again be retried), bus bridge 126 will perform processing to progress the request 302 to the point the reissued request can be immediately satisfied on the system fabric, for example, by issuing a corresponding request to remote system 134. LPC snoopers 304 that operate in this fashion are referred to herein as "progressing" snoopers and can be identified as such in optional type fields 232 of the PTEs 222 for real addresses assigned to these LPC snoopers 304.

In contrast, if dispatch logic 200 of IMC 124 accepts a request 300 for processing by one of MAs 202, IMC 124 does not issue a Retry partial response, but instead issues a partial response 306 acknowledging the request 302. As a result, assuming that no L2 cache 110 provides a partial response 306 indicating responsibility for servicing the request 302, the master 300 of the request 302 can expect IMC 124 to service the request 302 without requiring master 300 to re-issue the request 302. LPC snoopers 304 that operate in this fashion are referred to herein as "non-progressing" snoopers and can be identified as such in optional type fields 232 of the PTEs 222 for real addresses assigned to these LPC snoopers 304.

Figure 4:
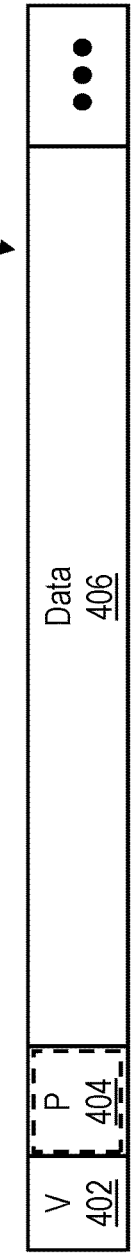
FIG. 4 illustrates an exemplary data tenure on a system interconnect of data processing system in accordance with one embodiment.

Referring now to FIG. 4, there is depicted an exemplary data tenure on a system fabric of data processing system 101 in accordance with one embodiment. In this example, data to be communicated from an LPC snooper 304 to a master 300 in response to a request 302 is communicated in one or more data tenures 400 on the system interconnect comprising system bus 130 and local bus 115. Each data tenure 400 optionally includes, in addition to possibly conventional valid and data fields 402, 406, a progressing (P) field 404 indicating whether data tenure 400 was transmitted by a progressing LPC snooper or a non-progressing LPC snooper.

Figure 5:
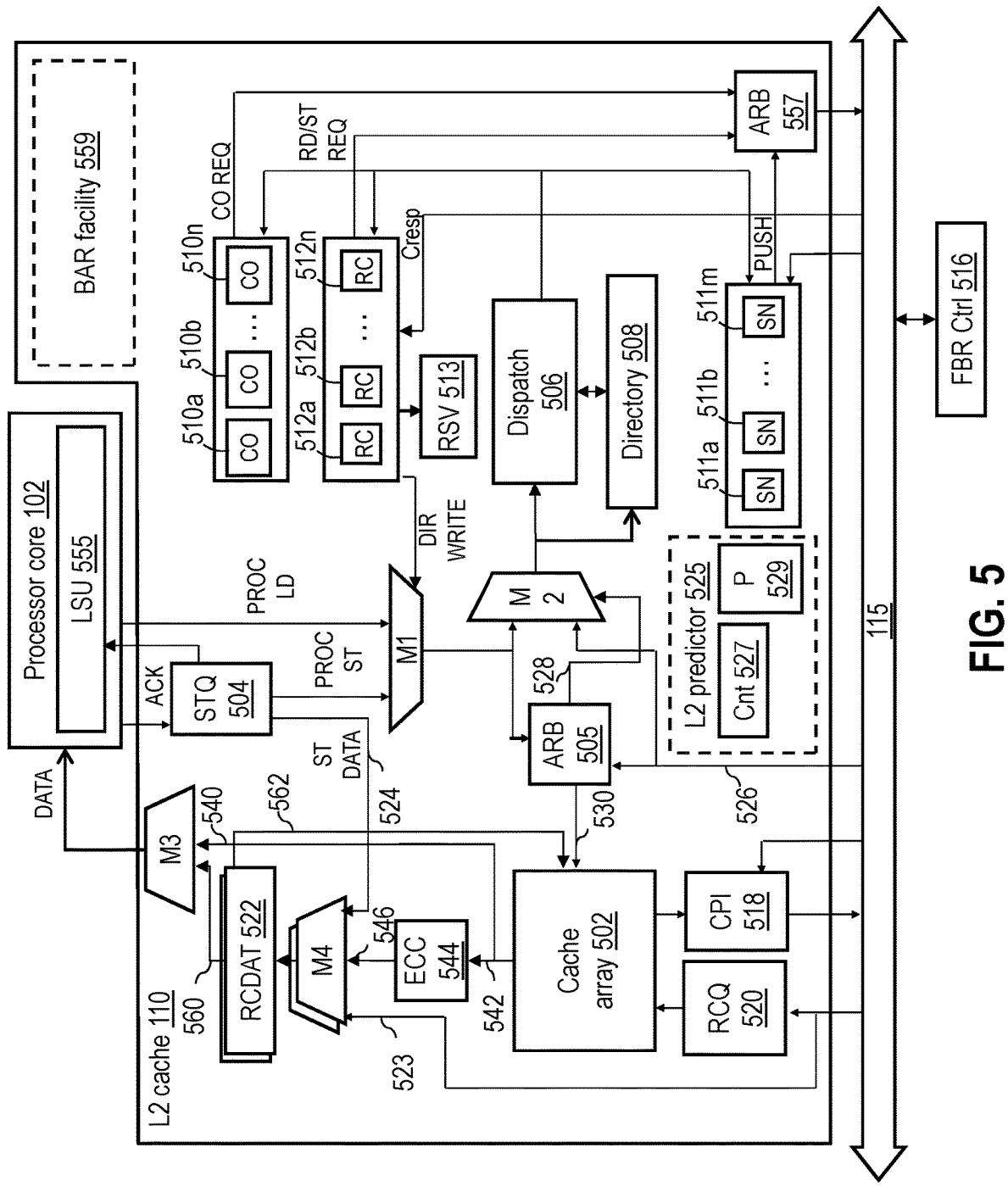
FIG. 5 is a more detailed block diagram of an L2 cache of FIG. 1 in accordance with one embodiment.

With reference now to FIG. 5, there is illustrated a more detailed block diagram of an exemplary L2 cache 110 in accordance with one embodiment. As shown in FIG. 5, L2 cache 110 includes a cache array 502 and a directory 508 of the contents of cache array 502. Although not explicitly illustrated, cache array 502 preferably is implemented with a single read port and a single write port to reduce the die area required to implement cache array 502.

Assuming cache array 502 and directory 508 are set-associative as is conventional, memory locations in system memory 132 are mapped to particular congruence classes within cache array 502 utilizing predetermined index bits within the system memory (real) addresses. The particular memory blocks stored within the cache lines of cache array 502 are recorded in cache directory 508, which contains one directory entry for each cache line. While not expressly depicted in FIG. 5, it will be understood by those skilled in the art that each directory entry in cache directory 508 includes various fields, for example, a tag field that identifies the real address of the memory block held in the corresponding cache line of cache array 502, a state field that indicate the coherence state of the cache line, and a least recently used (LRU) field indicating a replacement order for the cache line with respect to other cache lines in the same congruence class.

L2 cache 110 includes multiple (e.g., 16 or 32) read-claim (RC) machines 512a-512n for independently and concurrently servicing load (LD) and store (ST) requests received from the affiliated processor core 102. In addition, L2 cache 110 includes multiple (e.g., 16 or 32) snoop machines 511a-511m to service remote memory access requests originating from processor cores 102 other than the affiliated processor core 102. Each snoop machine 511 can independently and concurrently handle a remote memory access request "snooped" from local interconnect 514. As will be appreciated, the servicing of memory access requests by L2 cache 110 may require the replacement or invalidation of memory blocks within cache array 502. Accordingly, L2 cache 110 includes CO (castout) machines 510a-510n that manage the removal and writeback of memory blocks from cache array 502.

L2 cache 110 also includes an RC queue 520 and a CPI (castout push intervention) queue 518 that respectively buffer data being inserted into and removed from the cache array 502. RC queue 520 includes a number of buffer entries that each individually correspond to a particular one of RC machines 512 such that each RC machine 512 that is dispatched retrieves data from only the designated buffer entry. Similarly, CPI queue 518 includes a number of buffer entries that each individually correspond to a particular one of the castout machines 510 and snoop machines 511, such that each CO machine 510 and each snooper 511 that is dispatched retrieves data from only the respective designated CPI buffer entry.

Each RC machine 512 also has assigned to it a respective one of multiple RC data (RCDAT) buffers 522 for buffering a memory block read from cache array 502 and/or received from local interconnect 514 via reload bus 523. The RCDAT buffer 522 assigned to each RC machine 512 is preferably constructed with connections and functionality corresponding to the memory access requests that may be serviced by the associated RC machine 512. At least some of RCDAT buffers 522 have an associated store data multiplexer M4 that selects data bytes from among its inputs for buffering in the RCDAT buffer 522 in response unillustrated select signals generated by arbiter 505.

L2 cache 110 additionally includes an arbiter 505 configured to control multiplexers M1-M2 to order the processing of local memory access requests received from the affiliated processor core 102 and remote requests snooped on local interconnect 514. Memory access requests, including local load and store operations and remote read and write operations, are forwarded in accordance with the arbitration policy implemented by arbiter 505 to a dispatch pipeline 506 where each read/load and store request is processed with respect to directory 508 and cache array 502 over a given number of cycles.

L2 cache 110 additionally provides support for atomic updates by the associated processor core(s) 102 through the implementation of reservation logic 513, which tracks reservations established by atomic load (e.g., load-and-reserve (LARX)) requests to ensure that corresponding atomic store (e.g., store-conditional (STCX)) requests only complete successfully if the reserved cache lines have not been modified since the reservations were established (i.e., if the relevant reservation is still valid). In a typical embodiment, reservation logic 513 includes, for each thread, a respective reservation address register that specifies the base address of a cache line for which a reservation is established and a reservation flag indicating whether or not the reservation for the specified cache line is still valid.

In operation, processor store requests comprising a transaction type (ttype), target real address, and store data are received from the affiliated processor core 102 within a store queue (STQ) 504. From STQ 504, the store data are transmitted to store data multiplexer M4 via data path 524, and the store type and target address are passed to multiplexer M1. Multiplexer M1 also receives as inputs processor load requests from processor core 102 and directory write requests from RC machines 512. In response to unillustrated select signals generated by arbiter 505, multiplexer M1 selects one of its input requests to forward to multiplexer M2, which additionally receives as an input a remote request received from local interconnect 514 via remote request path 526. Arbiter 505 schedules local and remote memory access requests for processing and, based upon the scheduling, generates a sequence of select signals 528. In response to select signals 528 generated by arbiter 505, multiplexer M2 selects either the local request received from multiplexer M1 or the remote request snooped from local interconnect 514 as the next memory access request to be processed.

A request selected for processing by arbiter 505 is placed by multiplexer M2 into dispatch pipeline 506. Dispatch pipeline 506 preferably is implemented as a fixed duration pipeline in which each of multiple possible overlapping requests A, B, C, etc. is processed for a predetermined number of clock cycles. For example, dispatch pipeline 506 may process each request for four cycles.

During a first cycle of processing within dispatch pipeline 506, a 1-cycle directory read is performed utilizing the request address to determine if the request address hits or misses in directory 508, and if the memory address hits, the coherence state of the memory block within directory 508. The directory information, which includes a hit/miss indication and the coherence state of the memory block, is returned by directory 508 to dispatch pipeline 506 in a subsequent cycle, such as the fourth cycle. As will be appreciated, no action is generally taken within an L2 cache 110 in response to miss on a remote memory access request; such remote memory requests are accordingly discarded from dispatch pipeline 506. However, in the event of a hit or miss on a local memory access request or a hit on a remote memory access request, L2 cache 110 will service the memory access request, which for requests that cannot be serviced entirely within processing unit 100, may entail communication on local interconnect 514 via fabric controller 516.

At a predetermined time during processing of the memory access request within dispatch pipeline 506, arbiter 505 transmits the request address to cache array 502 via address and control path 530 to initiate a cache read of the memory block specified by the request address. A cache read takes 2 cycles in the exemplary embodiment. The memory block read from cache array 502 is transmitted via data path 542 to error correcting code (ECC) logic 544, which checks the memory block for errors and, if possible, corrects any detected errors. For processor load requests, the memory block is also transmitted to load data multiplexer M3 via data path 540 for forwarding to the affiliated processor core 102.

At the last cycle of the processing of a memory access request within dispatch pipeline 506, dispatch pipeline 506 make a dispatch determination. For example, dispatch pipeline 506 may make the dispatch determination based upon a number of criteria, including (1) the presence of an address collision between the request address and a previous request address currently being processed by a castout machine 510, snoop machine 511 or RC machine 512, (2) the directory information, and (3) availability of an RC machine 512 (for a local request of the affiliated processor core 102) or snoop machine 511 (for a snooped request of a remote processor core) to process the memory access request. If dispatch pipeline 506 makes a dispatch determination that the memory access request is to be dispatched, the memory access request is dispatched from dispatch pipeline 506 to an RC machine 512 or a snoop machine 511, as appropriate. If the memory access request fails dispatch, the failure is signaled to the requestor (e.g., local or remote processor core 102) by a retry response. The requestor may subsequently retry the failed memory access request, if necessary.

While an RC machine 512 is processing a local memory access request, the RC machine 512 has a busy status and is not available to service another request. While an RC machine 512 has a busy status, the RC machine 512 may perform a directory write to update the relevant entry of directory 508, if necessary. In addition, the RC machine 512 may perform a cache write to update the relevant cache line of cache array 502. A directory write and a cache write may be scheduled by arbiter 505 during any interval in which dispatch pipeline 506 is not already processing other requests according to the fixed scheduling of directory reads and cache reads. When all operations for the given request have been completed, the RC machine 512 returns to an unbusy state. It will be appreciated that the scheduling of non-fixed-schedule operations such as directory writes and cache writes can impact the scheduling of other operations, including those processed according to a fixed schedule.

The processing performed by CO machines 510, SN machines 511, and RC machines 512 may require a request to be issued on the system fabric, For example, CO machines 510 may issue CO requests, RC machines 512 may issue, among other things, read-type and store-type requests, and SN machines 511 may issue push requests. Requests of CO machines 510, SN machines 511, and RC machines 512 are ordered for presentation on the system fabric by an arbiter 557.

In some embodiments, L2 cache 110 may include an optional L2 predictor 525. As described further below with reference to FIG. 11, L2 predictor 525 may be utilized to determine the operating mode of an RC machine 512 in communicating with an LPC snooper. In this example, L2 predictor 525 includes a counter 527 and a progressing (P) flag 529, as discussed further below. In other alternative embodiments, L2 cache 110 may include a base address register (BAR) facility 559 that assigns one or more real address ranges to progressing LPC snooper(s) (and thus a progressing operating mode of RC machines 512) and/or one or more real address ranges to non-progressing LPC snooper(s) (and thus a non-progressing operating mode of RC machines 512).

Figure 6:
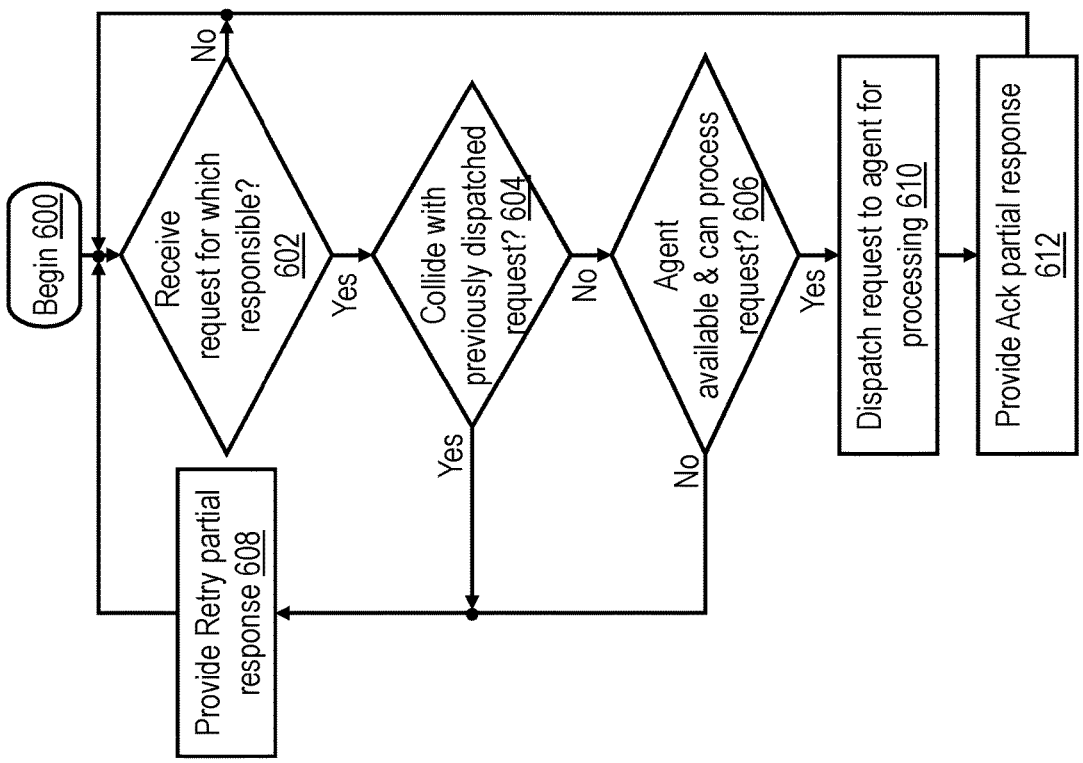
FIG. 6 is a high-level logical flowchart of an exemplary process by which dispatch logic of a memory controller processes a request received on the system interconnect in accordance with one embodiment.

Referring now to FIG. 6, there is depicted a high-level logical flowchart of an exemplary process by which dispatch logic 200 of an integrated memory controller (IMC) 124 (or any other non-progressing coherence agent) processes a request received on the system fabric of a data processing system 101 in accordance with one embodiment. The process of FIG. 6 begins at block 600 and then proceeds to block 602, which illustrates dispatch logic 200 of IMC 124 monitoring for receipt, on the system interconnect, of a request specifying a target real address for which the IMC 124 is responsible. Dispatch logic 200 of IMC 124 may determine responsibility of IMC 124 for the target real address of the snooped request by reference to an unillustrated BAR facility. In response to dispatch logic 200 of IMC 124 detecting receipt on the system interconnect of a request specifying a target real address for which the IMC 124 is responsible, dispatch logic 200 of IMC 124 determines at block 604 whether the request detected at block 602 collides with (i.e., specifies a target real address matching) the target real address of a previously received request that is currently being processed by one of MAs 202. If so, dispatch logic 200 provides a Retry partial response, as depicted at block 608. Assuming no L2 cache 110 provides a partial response indicating its responsibility to service the request, the Retry partial response provided at block 608 will cause a Retry Cresp to be generated, which will in turn cause the master of the request to subsequently reissue the request. Following block 608, the process of FIG. 6 returns to block 602.

Returning to block 604, if dispatch logic 200 makes a negative determination, dispatch logic 200 additionally determines at block 606 whether or not a MA 202 is currently available to process the request detected at block 602. If not, the process passes to block 608, which has been described. If, however, dispatch logic 200 determines at block 606 that a MA 202 is currently available to process the snooped request, dispatch logic 200 dispatches the request to an available one of MAs 202 for processing as described below with reference to FIG. 7 (block 610). In addition, dispatch logic 200 issues an Ack (acknowledge) partial response on the system interconnect, indicating that the request has been received and accepted by IMC 124 for processing (block 612). Thereafter, the process returns to block 602.

Figure 7:
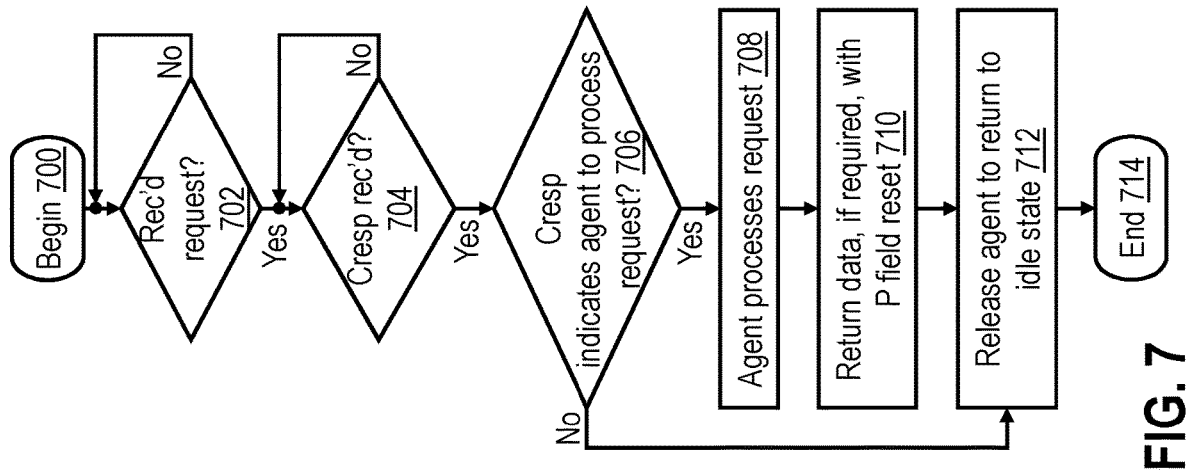
FIG. 7 is a high-level logical flowchart of an exemplary process by which a bus agent of a memory controller processes a request received on the system interconnect in accordance with one embodiment.

With reference now to FIG. 7, there is illustrated a high-level logical flowchart of an exemplary process by which a MA 202 of an IMC 124 processes a request received on the system fabric of data processing system 101 in accordance with one embodiment. Instances of the illustrated process can be performed concurrently by MAs 202a-202m.

The process of FIG. 7 begins at block 700 with and then proceeds to block 702, which illustrates a MA 202 remaining in an idle state until it receives a request dispatched by the associated dispatch logic 200, for example, at block 610 of FIG. 6. In response to receipt of a request from dispatch logic 200, the MA 202 transitions from an idle state to an active state and monitors for receipt of the Cresp associated with the request (block 704). In response to receipt of the Cresp associated with the request, MA 202 determines at block 706 whether or not the Cresp indicates the MA 202 is to process the request. If not, the process of FIG. 7 passes to block 712, which is described below. If, however, MA 202 determines at block 706 that the Cresp indicates the MA 202 is to process the request, MA 202 processes the request, for example, by accessing a copy of a memory block identified by the target real address of the request or by updating the memory block identified by the target real address with data provided by the master (block 708). As indicated at block 710, if required, MA 202 returns data to the master in response to the request. Any data tenure 400 issued by MA 202 on the system fabric that conveys data responsive to the request preferably includes a P field 404 that is reset to indicate that the LPC snooper servicing the request is a non-progressing snooper. Thereafter, MA 202 is released to return to an idle state (block 712), and the process of FIG. 7 ends at block 714.

Figure 8:
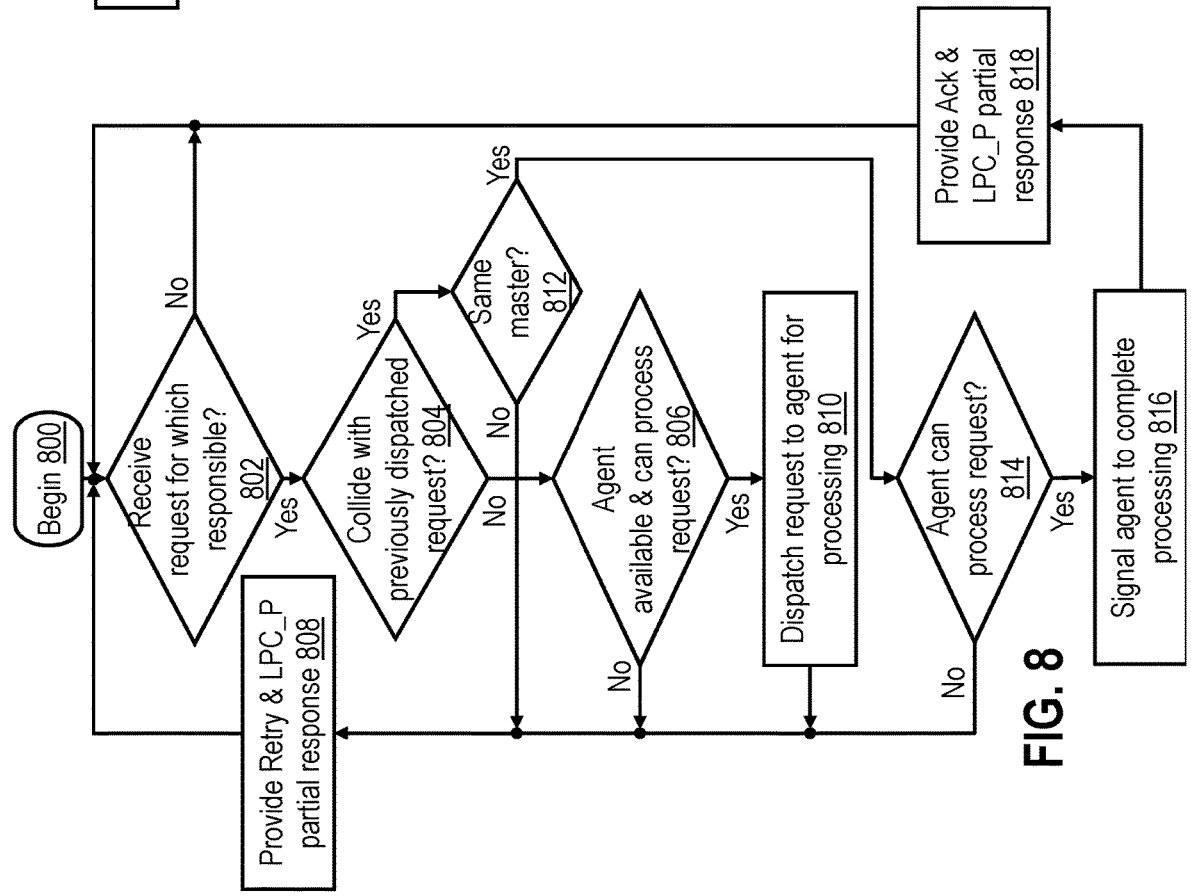
FIG. 8 is a high-level logical flowchart of an exemplary process by which dispatch logic of a bus bridge processes a request received on the system interconnect in accordance with one embodiment.

Referring now to FIG. 8, there is depicted a high-level logical flowchart of an exemplary process by which dispatch logic 210 of a bus bridge 126 (or any other progressing LPC)

processes a request received on the system fabric of data processing system 101 in accordance with one embodiment.

The process of FIG. 8 begins at block 800 and then proceeds to block 802, which illustrates dispatch logic 210 of IMC 124 monitoring for receipt, on the system interconnect, of a request specifying a target real address for which the bus bridge 126 is responsible. Dispatch logic 210 of bus bridge 126 may determine responsibility of bus bridge 126 for the target real address of the snooped request by reference to an unillustrated BAR facility. In response to dispatch logic 210 detecting receipt on the system interconnect of a request specifying a target real address for which bus bridge 126 is responsible, dispatch logic 210 determines at block 804 whether the request detected at block 602 collides with (i.e., specifies a target real address matching) the target real address of a previously received request that is currently being processed by one of BAs 212. If so, the process proceeds to block 812, which is described below. If, however, dispatch logic 210 makes a negative determination at block 804, dispatch logic 210 additionally determines at block 806 whether or not a BA 212 is currently available to process the request detected at block 802. If not, the process passes to block 808, which is described below. If, however, dispatch logic 210 determines at block 806 that a BA 212 is currently available to process the snooped request, dispatch logic 210 dispatches the request to an available one of BAs 212 for processing as described below with reference to FIG. 9 (block 810). In response to receipt of the request, the BA 212 to which the request is dispatched may perform some preliminary processing, for example, issuing a request to remote system 134, but does not complete the processing. This preliminary processing allows BA 212 to later immediately complete the request when re-presented on some subsequent attempt. Thereafter, the process passes to block 808, which depicts dispatch logic 210 providing a Retry partial response and a LPC_P partial response. The LPC_P partial response (which may be provided by asserting an additional bit in the same partial response that indicates Retry) indicates that the LPC snooper providing the partial response is a progressing LPC snooper. The Retry partial response provided at block 808 will cause a Retry Cresp to be generated, which will in turn cause the master of the request to subsequently reissue the request. Due to the assertion of the LPC_P partial response, the generated Retry Cresp will also indicate that the LPC was a progressing agent. The absence of the additional indication in the Retry Cresp (in FIGS. 6 and 7) implies the LPC is a non-progressing agent. It should be noted that dispatch logic 210 provides the Retry and LPC_P partial responses at block 808 regardless of whether the request detected at block 802 is dispatched to a BA 212 for handling.

Referring now to block 812, dispatch logic 210 determines whether or not the master of the request detected at block 802 is the same master as issued the previously received request for which a collision was detected. This determination can be made, for example, by reference to the respective master tags included in the requests. In response to a negative determination at block 812, the process passes to block 808, which has been described. If, however, dispatch logic 212 makes a determination at block 812 that the request detected at block 802 is from the same master as the previous still-pending request for which a collision was detected, dispatch logic 210 determines at block 814 whether or not the BA 212 to which the previous request was dispatched is now ready to process the reissued request. If not, the process returns to block 808, which has been described. If, however, dispatch logic 210 determines at block 814 that the BA 212 is ready to process the request, dispatch logic 210 signals the BA 212 to complete processing of the request, as shown at block 816. In addition, dispatch logic 210 provides an Ack partial response indicating that the request can be processed and a LPC_P partial response indicating the LPC snooper is a progressing snooper (block 818). Based on these partial responses, a Cresp other than Retry will be generated for the request, meaning that the master will stop reissuing the request. Additionally, the Cresp will indicate to the master that the coherence agent responsible for servicing the request was a progressing agent. Following block 818, the process of FIG. 8 returns to block 802, which has been described.

Figure 9:
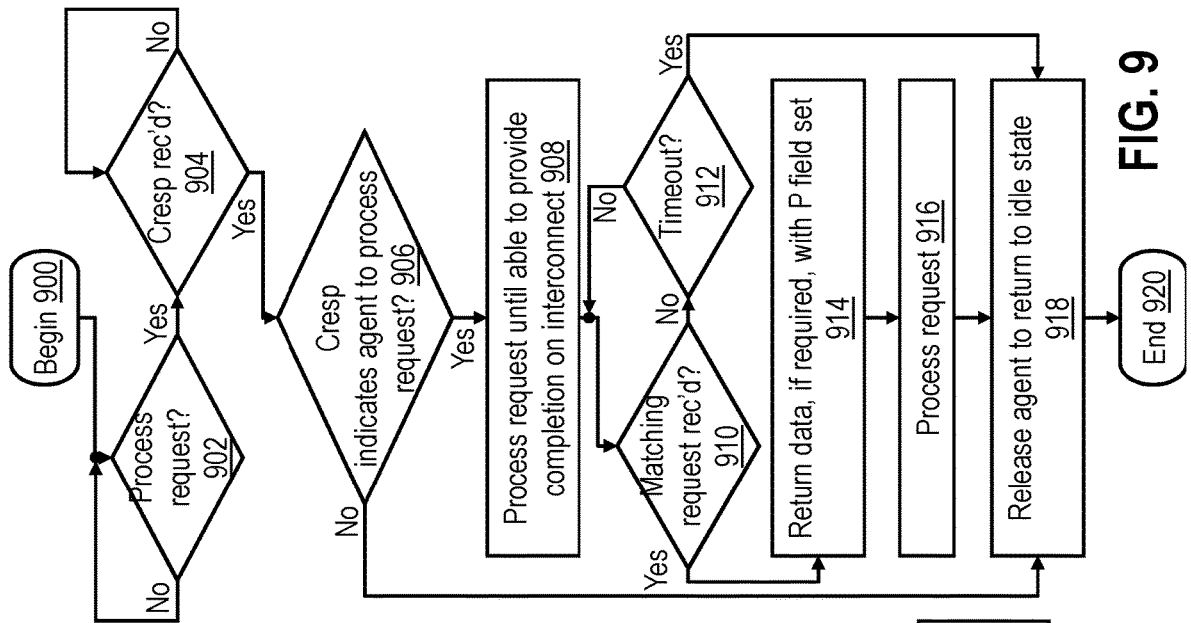
FIG. 9 is a high-level logical flowchart of an exemplary process by which a bus agent of a bus bridge processes a request received on the system interconnect in accordance with one embodiment.

With reference now to FIG. 9, there is illustrated a high-level logical flowchart of an exemplary process by which a BA 212 of a bus bridge 126 (or any other progressing agent) processes a request received on the system fabric of data processing system 101 in accordance with one embodiment. Instances of the illustrated process can be performed concurrently by BAs 212a-212k.

The process of FIG. 9 begins at block 900 with and then proceeds to block 902, which illustrates a BA 212 remaining in a busy state and monitoring for a signal from the associated dispatch logic 210, for example, at block 810 of FIG. 8, that it is to begin processing of the request, for example, by forwarding a corresponding request to remote system 134 or data processing system 101, and continuing the processing to a point that the request can be immediately satisfied by BA 212 on a subsequent re-presentation of the request, as shown at block 910 (discussed below). In response to receipt of from dispatch logic 210 of a signal to begin processing of the request, the BA 212 monitors for receipt on the system fabric of data processing system 101 of the Cresp associated with the initially accepted request (block 904). In response to receipt of the Cresp associated with the initially accepted request, BA 212 determines at block 906 whether or not the Cresp indicates the BA 212 is to process the request. If not, the process of FIG. 9 passes to block 918, which is described below. If, however, BA 212 determines at block 906 that the Cresp indicates the BA 212 is to process the request, BA 212 processes the request until it is able to immediately complete the request on the system fabric of data processing system 101, for example, by accessing a copy of a memory block identified by the target real address of the request or by preparing to issue an update to the memory block identified by the target real address with data provided by the master (block 908).

Following block 908, BA 212 determines at block 910 whether or not a matching request issued by the same master has been received via the system fabric, as signaled at block 816 of FIG. 8. If so, the process passes to block 914, which is described below. If, however, BA 212 does not detect a matching request at block 910, BA 212 determines at block 912 whether the request dispatched to BA 212 has timed out (i.e., not been re-presented by the master within a given time period). If not, the process returns to block 910. If, however, BA 212 determines at block 912 that the request has timed out, the process passes to block 918, which is described below.

Referring now to block 914, in response to detection of a matching request issued by the same master that can now be immediately satisfied, BA 212 returns data required by the request, if any, to the master, as shown at block 914. Each data tenure 400 issued by BA 212 on the system fabric that conveys data responsive to the request preferably includes a P field 404 that is set to indicate that the LPC snooper servicing the request is a progressing snooper. BA 212 additionally completes processing on the request in accordance with the bus protocol implemented for the system fabric (block 916) and is then released to return to an idle state (block 918). The process of FIG. 9 then at block 920.

Figure 10:
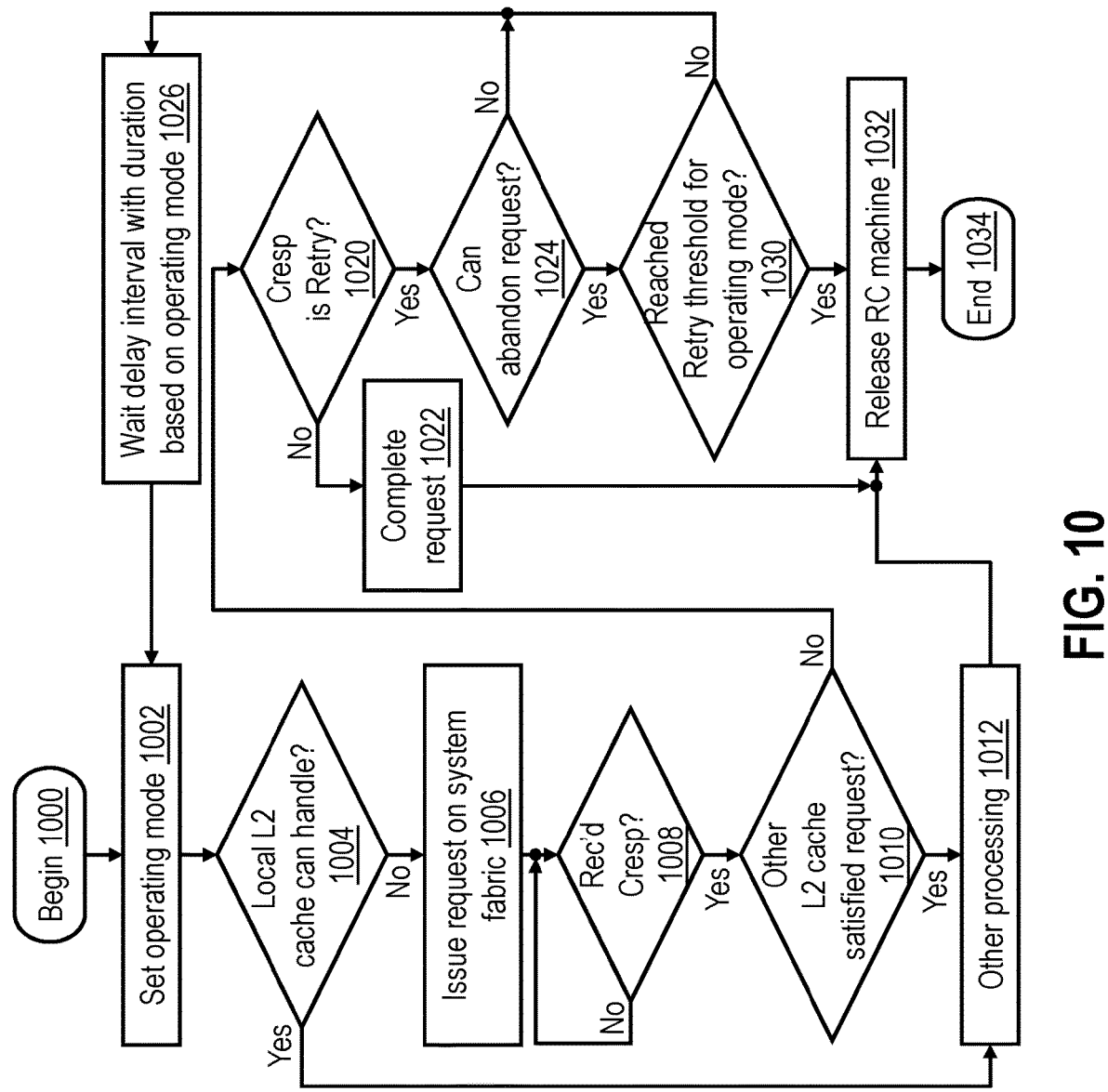
FIG. 10 is a high-level logical flowchart of an exemplary process by which a master issues requests on the system interconnect of a data processing system in accordance with one embodiment.

Referring now to FIG. 10, there is depicted a high-level logical flowchart of an exemplary process by which a master issues requests on the system fabric of a data processing system 101 in accordance with one embodiment. Instances of the illustrated process can be performed concurrently by multiple masters 300 distributed throughout data processing system 101. For ease of understanding, FIG. 10 is described with respect to an exemplary operating scenario in which the master 300 is a RC machine 512.

The process of FIG. 10 begins at block 1000, for example, in response to dispatch of a RC machine 512 to service a memory access request of the associated processor core 102. The process then proceeds to block 1002, which illustrates RC machine 512 setting its operating mode to optimize its behavior for either a progressing LPC snooper or a non-progressing LPC snooper. In a first embodiment in which PTEs 222 includes optional type fields 232, RC machine 512 consults the PTE 222 associated with the target real address of the memory access request and sets its operating mode to optimize its behavior for either a progressing or non-progressing LPC snooper based on the type field 232 of the relevant PTE. In an alternative second embodiment in which L2 cache 110 includes BAR facility 559, RC machine 512 consults the BAR facility 559 and sets its operating mode to optimize its behavior for either a progressing or non-progressing LPC snooper based on the whether BAR facility 559 associates the target real address of the request with a progressing or non-progressing LPC. In an alternative third embodiment, RC machine 512 may set its operating mode by default at block 1002 to a non-progressing LPC operating mode and then updates the operating mode only on a second pass through block 1002 based on a value indicated by the Cresp of the first issuance of the memory access request on the system fabric. As will be appreciated, Cresp logic 121c can determine the appropriate mode to indicate based on the presence of the LPC_P partial response in the Presp provided by the LPC snooper (as described above with reference to blocks 808 and 816 of FIG. 8) and/or the absence of the LPC_P partial response in the Presp provided by the LPC snooper (as described above with reference to blocks 608 and 612 of FIG. 6). In an alternative fourth embodiment, RC machine 512 sets its operating mode by reference to the operating mode indicated by P flag 529 of optional L2 predictor 525. An exemplary process by which L2 predictor 525 sets P flag 529 is described in detail below with reference to FIG. 11.

Following block 1102, the process of FIG. 10 passes to block 1004, which illustrates RC machine 512 determining, for example, based on the results of the lookup performed in directory 508 and the type of memory access request, whether the memory access request can be serviced by the L2 cache 110 containing the RC machine 512 without issuing a request on the system fabric. If not, the process passes to block 1006, which is described below. If, however, RC machine 512 makes an affirmative determination at block 1004, the process proceeds to block 1012, which illustrates RC machine 512 servicing the request utilizing other, possibly conventional processing. The process then passes to block 1032, which is described below.

Block 1006 illustrates RC machine 512 issuing a memory access request on the system fabric of data processing system 101. RC machine 512 then monitors for receipt of the Cresp of the memory access request via the system fabric (block 1008). At block 1010, RC machine 512 determines whether or not the Cresp of the memory access request indicates that the memory access request will be satisfied by another L2 cache 110 of data processing system 101. If so, the process passes to block 1012, which has been described. If, however, RC machine 512 makes a negative determination at block 1010, the process proceeds to block 1020. Block 1020 illustrates RC machine 512 determining whether or not the Cresp of the memory access request is a Retry Cresp. If so, the process passes to block 1024, which is described below. If not, RC machine 512 completes processing of the memory access request, for example, by providing requested data to processor core 102, etc. (block 1022). The process then proceeds to block 1032, which is described below.

At block 1024, RC machine 512 determines whether or not the memory access request can be abandoned. For example, in one embodiment, RC machine 512 determines at block 1024 that the memory access request issued on the system fabric can be abandoned if the original request received from the associated processor core 102 is a prefetch request and otherwise determines that the memory access request issued on the system fabric cannot be abandoned. In response to a determination at block 1024 that the memory access request can be abandoned, the process passes to block 1030, which is described below. In response to a determination at block 1024 that the memory access request issued on the system fabric cannot be abandoned, the process passes to block 1026, which illustrates RC machine 512 waiting a delay interval having a duration based on the operating mode initially set at block 1002. In a preferred embodiment, the durations for the progressing and non-progressing operating modes are different. The delay interval duration for the non-progressing mode can be set, for example, to a duration after which a MA 202 would be expected to become available. The delay interval duration for the progressing mode can be set, for example, to be greater than the average latency of requests issued to remote system 134. It should be appreciated that in various different implementations, the delay interval duration for either the progressing or non-progressing modes can be longer than that of the other operation mode. The process then returns to block 1002, which, in a preferred implementation, only potentially updates the operating mode in the third embodiment that utilizes the Cresp of the first issuance of the memory access request to determine the preferred operating mode of RC machine 512.

Referring now to block 1030, RC machine 512 determines whether or not the abandonable memory access request has received a Retry Cresp a threshold number of times, where the threshold number is dependent on the operating mode determined at block 1002. In one preferred embodiment, the threshold number is higher for the progressing operating mode and lower for the non-progressing mode. In response to a determination at block 1030 that memory access request has not received a Retry Cresp the relevant threshold number of times, the process passes to block 1026, which has been described. Otherwise, if RC machine 512 determines at block 1030 that the memory access request has received a Retry Cresp the threshold number of times for its operating mode, RC machine 512 abandons the memory access request. Accordingly, RC machine 512 is released to return to an idle state (block 1032), and the process of FIG. 10 ends at block 1034.

Figure 11:
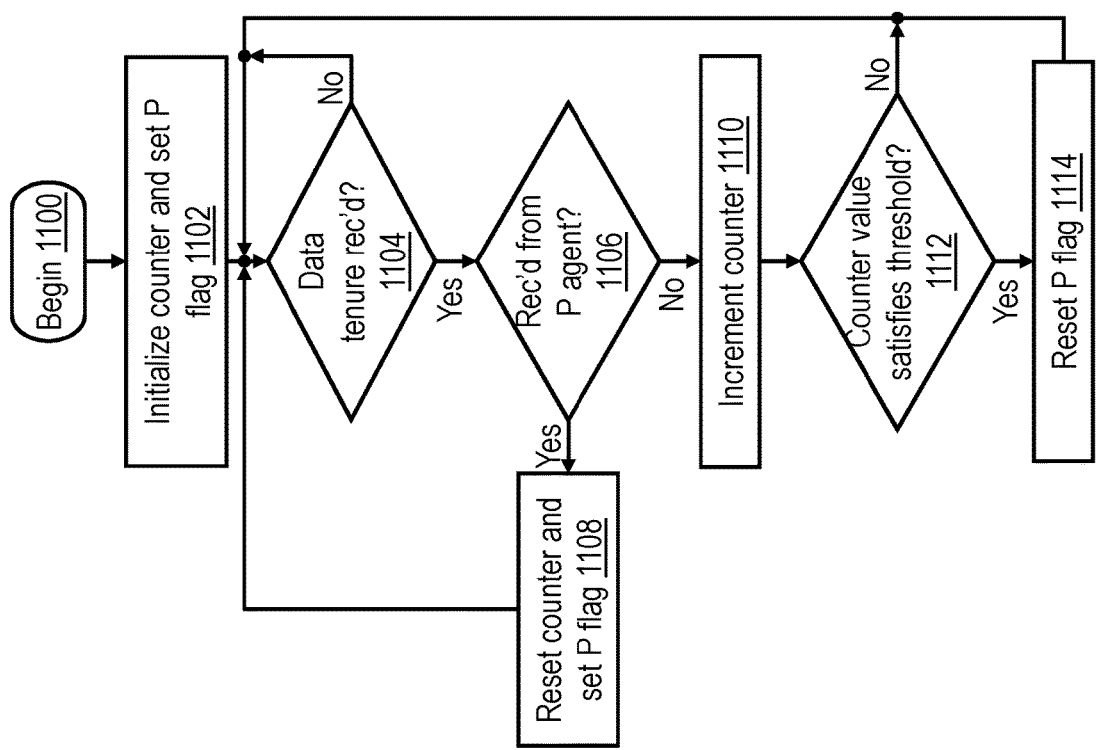
FIG. 11 is a high-level logical flowchart of an exemplary process by which a predictor associated with a master of operations of the system fabric of a data processing system determines an operating mode of a master in accordance with one embodiment.

With reference now to FIG. 11, there is illustrated a high-level logical flowchart of an exemplary process by which predictor associated with a master determines an operating mode of the master in accordance with one embodiment. The illustrated process can be utilized, for example, by an L2 predictor 525 to set the operating mode for the RC machines 512 of an L2 cache 110 at block 1002 of FIG. 10 in accordance with the fourth embodiment discussed above. In the exemplary embodiment hereafter described, L2 predictor 525 includes a saturating counter 527 that is constrained to have a non-negative value and a progressing (P) flag 529 that is set to indicate a progressing operating mode and that is otherwise reset to indicate a non-progressing operating mode.

The process of FIG. 11 begins at block 1100 and then proceeds to block 1102, which illustrates L2 predictor 525 initializing counter 527, for example to zero and setting P flag 529 to indicate a progressing operating mode. At block 1104, L2 predictor 525 monitors for receipt of a data tenure 400 by L2 cache 110. In response to receipt of a data tenure, L2 predictor 525 determines by reference to progressing field 404 of the data tenure 400 whether the data tenure 400 was received from a progressing LPC snooper (block 1106). If so, L2 predictor 525 resets the count value of counter 527 and sets P flag 529 to indicate the progressing operating mode (block 1108). The process then returns to block 1104, which has been described. If, however, L2 predictor 525 determines at block 1106 that the data tenure 400 was received from a non-progressing LPC snooper, L2 predictor 525 increments counter 527 in a saturating fashion (block 1110). At block 1112, L2 predictor 525 determines whether or not the count value of counter 527 satisfies (e.g., is greater than or equal to) a threshold. If not, the process returns to block 1104, which has been described. If, however, L2 predictor 525 determines at block 1112 that the count value of counter 527 satisfies the threshold, L2 predictor 125 resets progressing (P) flag 529 to indicate the non-progressing operating mode (block 1114). Following block 1114, the process of FIG. 11 returns to block 1104, which has been described.

Figure 12:
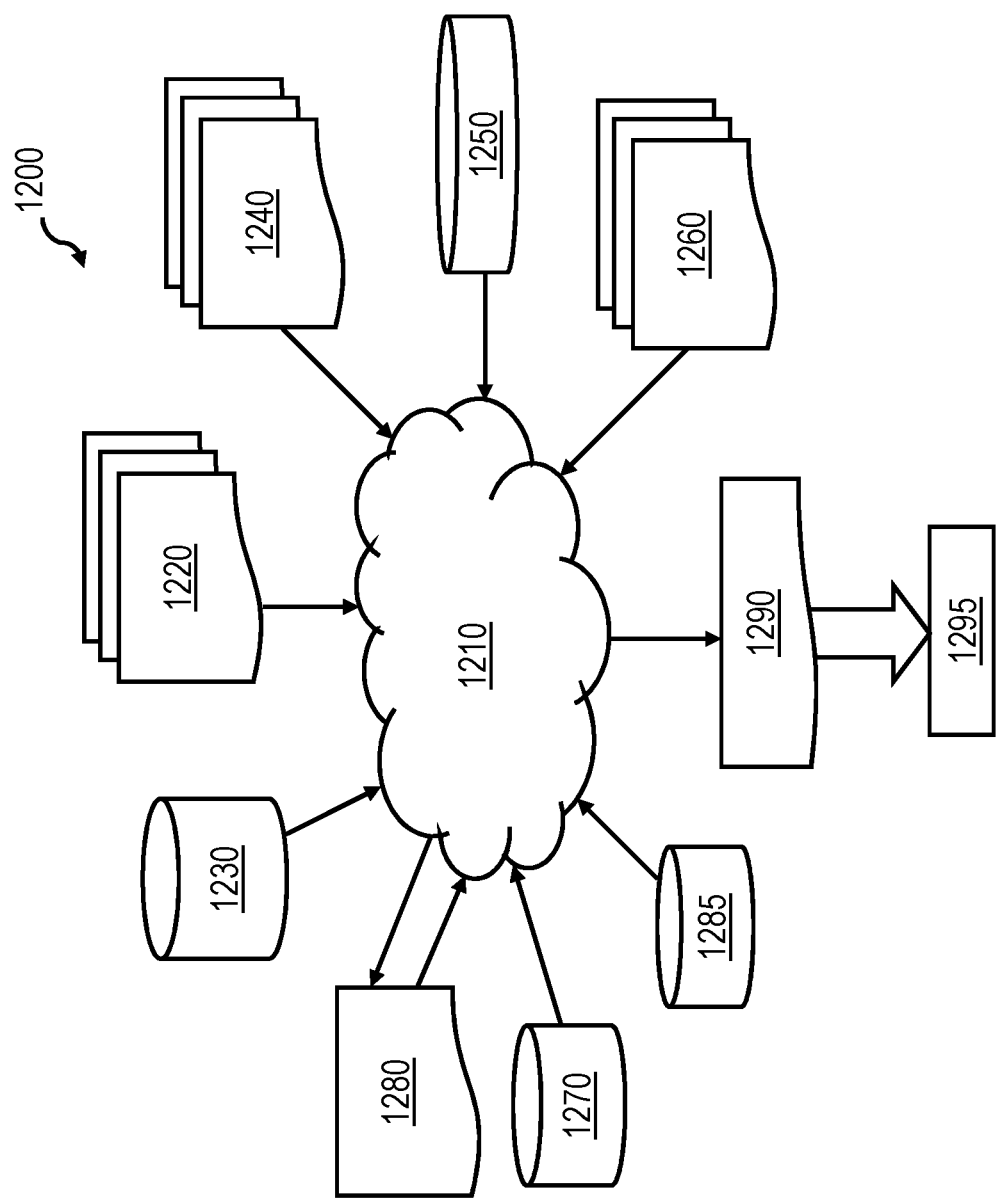
FIG. 12 depicts an exemplary design process in accordance with one embodiment.

With reference now to FIG. 12, there is depicted a block diagram of an exemplary design flow 1200 used for example, in semiconductor IC logic design, simulation, test, layout, and manufacture. Design flow 1200 includes processes, machines and/or mechanisms for processing design structures or devices to generate logically or otherwise functionally equivalent representations of the design structures and/or devices described above and shown herein. The design structures processed and/or generated by design flow 1200 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1200 may vary depending on the type of representation being designed. For example, a design flow 1200 for building an application specific IC (ASIC) may differ from a design flow 1200 for designing a standard component or from a design flow 1200 for instantiating the design into a programmable array, for example a programmable gate array (PGA) or a field programmable gate array (FPGA) offered by Altera® Inc. or Xilinx® Inc.

FIG. 12 illustrates multiple such design structures including an input design structure 1020 that is preferably processed by a design process 1210. Design structure 1220 may be a logical simulation design structure generated and processed by design process 1210 to produce a logically equivalent functional representation of a hardware device. Design structure 1220 may also or alternatively comprise data and/or program instructions that when processed by design process 1210, generate a functional representation of the physical structure of a hardware device. Whether representing functional and/or structural design features, design structure 1220 may be generated using electronic computer-aided design (ECAD) such as implemented by a core developer/designer. When encoded on a machine-readable data transmission, gate array, or storage medium, design structure 1220 may be accessed and processed by one or more hardware and/or software modules within design process 1210 to simulate or otherwise functionally represent an electronic component, circuit, electronic or logic module, apparatus, device, or system such as those shown herein. As such, design structure 1220 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1210 preferably employs and incorporates hardware and/or software modules for synthesizing, translating, or otherwise processing a design/simulation functional equivalent of the components, circuits, devices, or logic structures shown herein to generate a netlist 1280 which may contain design structures such as design structure 1220. Netlist 1280 may comprise, for example, compiled or otherwise processed data structures representing a list of wires, discrete components, logic gates, control circuits, I/O devices, models, etc. that describes the connections to other elements and circuits in an integrated circuit design. Netlist 1280 may be synthesized using an iterative process in which netlist 1280 is resynthesized one or more times depending on design specifications and parameters for the device. As with other design structure types described herein, netlist 1280 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1210 may include hardware and software modules for processing a variety of input data structure types including netlist 1280. Such data structure types may reside, for example, within library elements 1230 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1240, characterization data 1250, verification data 1260, design rules 1220, and test data files 1285 which may include input test patterns, output test results, and other testing information. Design process 1210 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1210 without deviating from the scope and spirit of the invention. Design process 1210 may also include modules for performing standard circuit design processes such as timing analysis, verification, design rule checking, place and route operations, etc.

Design process 1210 employs and incorporates logic and physical design tools such as HDL compilers and simulation model build tools to process design structure 1220 together with some or all of the depicted supporting data structures along with any additional mechanical design or data (if applicable), to generate a second design structure 1290. Design structure 1290 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1220, design structure 1290 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1290 may comprise a compiled, executable HDL simulation model that functionally simulates the devices shown herein.

Design structure 1290 may also employ a data format used for the exchange of layout data of integrated circuits and/or symbolic data format (e.g., information stored in a GDSII (GDS2), GL1, OASIS, map files, or any other suitable format for storing such design data structures). Design structure 1290 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1290 may then proceed to a stage 1295 where, for example, design structure 1290: proceeds to tape-out, is released to manufacturing, is released to a mask house, is sent to another design house, is sent back to the customer, etc.

As has been described, in at least one embodiment, a data processing system includes a plurality of snoopers, a processing unit including master, and a system fabric communicatively coupling the master and the plurality of snoopers. The master sets a retry operating mode for an interconnect operation in one of alternative first and second operating modes. The first operating mode is associated with a first type of snooper, and the second operating mode is associated with a different second type of snooper. The master issues a memory access request of the interconnect operation on the system fabric of the data processing system. Based on receipt of a combined response representing a systemwide coherence response to the request, the master delays an interval having a duration dependent on the retry operating mode and thereafter reissues the memory access request on the system fabric.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a processing unit including a master, a plurality of snoopers, and a system fabric communicatively coupling the master and the plurality of snoopers, the method comprising:

the master setting a retry operating mode for an interconnect operation in one of alternative first and second operating modes, wherein the first operating mode is associated with a first type of snooper and the second operating mode is associated with a different second type of snooper;

the master issuing a memory access request of the interconnect operation on the system fabric of the data processing system; and based on receipt of a combined response representing a systemwide coherence response to the request, the master delaying an interval having a duration dependent on the retry operating mode and thereafter reissuing the memory access request on the system fabric, wherein the interval has a first duration based on the retry operating mode being the first operating mode and the interval has a longer second duration based on the retry operating mode being the second operating mode.

2. The method of claim 1, wherein:

the memory access request specifies a target address;

the target address has an associated page table entry including effective-to-real address translation information for the target address and additionally including a type field; and the setting includes setting the retry operating mode based on the type field in the page table entry.

3. The method of claim 1, wherein:
the memory access request specifies a target address;
the processing unit includes a base address register facility that associates certain addresses with the first operating mode and associates other addresses with the second operating mode; and
the setting includes setting the retry operating mode utilizing the base address register facility.

4. The method of claim 1, wherein:
the setting includes updating the retry operating mode based upon an indication provided in the combined response.

5. The method of claim 1, wherein:
the processing unit includes a mode predictor updated based on data sources of data returned by previous memory access requests; and
the setting includes setting the retry operating mode utilizing the mode predictor.

6. The method of claim 1, further comprising:
the master setting a retry threshold for abandoning the memory access request to one of multiple different values based on the retry operating mode; and
the master abandoning the memory access request based on a number of retry combined responses for the memory access request satisfying the retry threshold for the retry operating mode that was set.

7. A processing unit, comprising:
a processor core;
interconnect logic configured to couple the processing unit to a system fabric of a multiprocessor data processing system;
a cache hierarchy coupled to the processor core, the cache hierarchy including a master configured to perform:
  setting a retry operating mode for an interconnect operation in one of alternative first and second operating modes, wherein the first operating mode is associated with a first type of snooper and the second operating mode is associated with a different second type of snooper;
  issuing a memory access request of the interconnect operation on the system fabric of the data processing system; and
  based on receipt of a combined response representing a systemwide coherence response to the request, delaying an interval having a duration dependent on the retry operating mode and thereafter reissuing the memory access request on the system fabric wherein the interval has a first duration based on the retry operating mode being the first operating mode and the interval has a longer second duration based on the retry operating mode being the second operating mode.

8. The processing unit of claim 7, wherein:
the memory access request specifies a target address;
the target address has an associated page table entry including effective-to-real address translation information for the target address and additionally including a type field; and
the setting includes setting the retry operating mode based on the type field in the page table entry.

9. The processing unit of claim 7, wherein:
the memory access request specifies a target address;
the processing unit includes a base address register facility that associates certain addresses with the first operating mode and associates other addresses with the second operating mode; and
the setting includes setting the retry operating mode utilizing the base address register facility.

10. The processing unit of claim 7, wherein:
the setting includes updating the retry operating mode based upon an indication provided in the combined response.

11. The processing unit of claim 7, wherein:
the processing unit includes a mode predictor updated based on data sources of data returned by previous memory access requests; and
the setting includes setting the retry operating mode utilizing the mode predictor.

12. The processing unit of claim 7, wherein the master is further configured to perform:
the master setting a retry threshold for abandoning the memory access request to one of multiple different values based on the retry operating mode; and
the master abandoning the memory access request based on a number of retry combined responses for the memory access request satisfying the retry threshold for the retry operating mode that was set.

13. A multiprocessing data processing system, comprising:
multiple processing units in accordance with claim 7; and
the system interconnect coupling the multiple processing units.

14. A design structure tangibly embodied in a machine-readable storage device for designing, manufacturing, or testing an integrated circuit, the design structure comprising:
a processing unit, including:
  a processor core;
  interconnect logic configured to couple the processing unit to a system fabric of a multiprocessor data processing system;
  a cache hierarchy coupled to the processor core, the cache hierarchy including a master configured to perform:
    setting a retry operating mode for an interconnect operation in one of alternative first and second operating modes, wherein the first operating mode is associated with a first type of snooper and the second operating mode is associated with a different second type of snooper;
    issuing a memory access request of the interconnect operation on the system fabric of the data processing system; and
    based on receipt of a combined response representing a systemwide coherence response to the request, delaying an interval having a duration dependent on the retry operating mode and thereafter reissuing the memory access request on the system fabric, wherein the interval has a first duration based on the retry operating mode being the first operating mode and the interval has a longer second duration based on the retry operating mode being the second operating mode.

15. The design structure of claim 14, wherein:
the memory access request specifies a target address;
the target address has an associated page table entry including effective-to-real address translation information for the target address and additionally including a type field; and
the setting includes setting the retry operating mode based on the type field in the page table entry.

16. The design structure of claim 14, wherein:
the memory access request specifies a target address;

the processing unit includes a base address register facility that associates certain addresses with the first operating mode and associates other addresses with the second operating mode; and the setting includes setting the retry operating mode utilizing the base address register facility.

17. The design structure of claim 14, wherein:

the setting includes updating the retry operating mode based upon an indication provided in the combined response.

18. The design structure of claim 14, wherein:

the processing unit includes a mode predictor updated based on data sources of data returned by previous memory access requests; and the setting includes setting the retry operating mode utilizing the mode predictor.

19. The design structure of claim 14, wherein the master is further configured to perform:

the master setting a retry threshold for abandoning the memory access request to one of multiple different values based on the retry operating mode; and the master abandoning the memory access request based on a number of retry combined responses for the memory access request satisfying the retry threshold for the retry operating mode that was set.

* * * * *